J. L. Nicolai.

Railroad Track Layer.

Nº 47,033.

Patented Mar. 28, 1865.

Witnesses.
F. H. Brown.
C. W. Reed.

Inventor.
John L. Nicolai
by Coburn & Man
Attorneys.

UNITED STATES PATENT OFFICE.

JOHN L. NICOLAI, OF CHICAGO, ILLINOIS.

AUTOMATIC TRACK-LAYER.

Specification forming part of Letters Patent No. 47,033, dated March 28, 1865; antedated March 10, 1865.

*To all whom it may concern:*

Be it known that I, JOHN L. NICOLAI, of Chicago, in the county of Cook and State of Illinois, have invented a new and useful Improved Automatic Track-Laying Vehicle; and I do hereby declare that the following is a full, clear, and exact description of the same, reference being had to the accompanying drawings and the letters and figures marked thereon, which form part of this specification.

Figure 1:
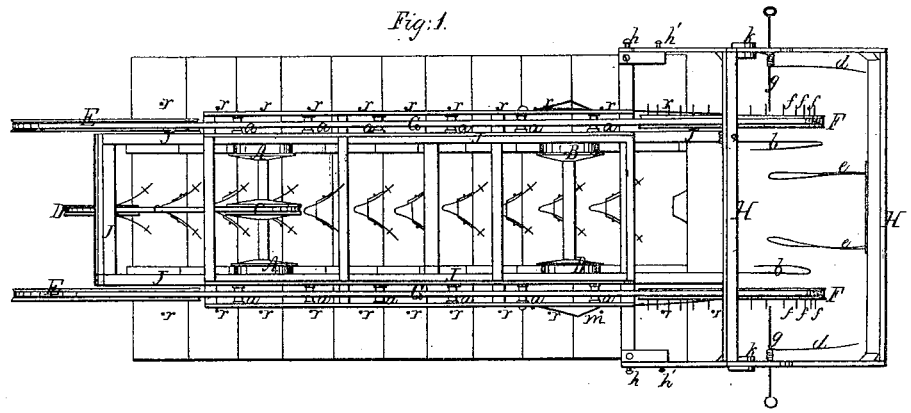
Figure 2:
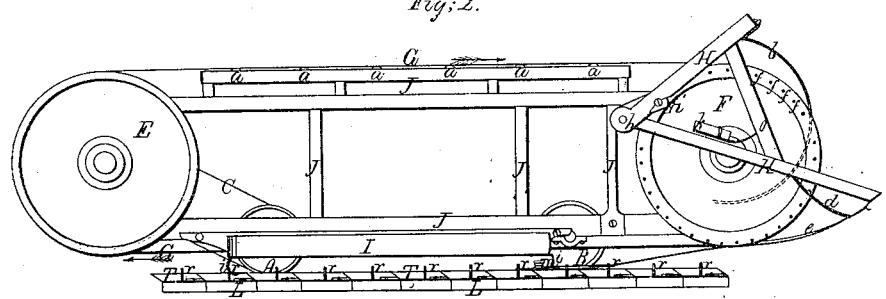
Figure 3:
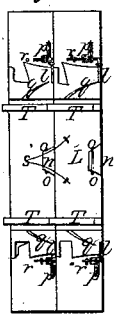

In the said drawings, Figure 1 represents a plan or top view of my invention. Fig. 2 is a side view thereof, and Fig. 3 is a plan view of the removable track or road upon which my automatic track-laying vehicle is propelled and moves.

The nature of my invention consists in making a road or track consisting of suitable planks arranged at right angles with the direction of the road or track, upon which a track is laid in sections, so that each plank with the section of track thereon may be readily taken up from the rear of the vehicle and deposited in front thereof, thus forming a continuous track laid upon a plank road for said vehicle to pass over by using only planks enough to form a track of the length of the vehicle, substantially as is hereinafter described.

My invention further consists in providing the vehicle aforesaid, which is to be propelled and moved over and upon said road and track, with certain mechanism or automatic devices, whereby the said planks forming the road and provided with the said sectional track are taken up and removed from the rear of the said vehicle as it moves along and deposited in front thereof, thus forming a continuous track, as aforesaid, so long as the vehicle is moved forward.

The object of my invention is to provide a vehicle whereby heavy ordnance or other military stores, or in fact any freight whatever, may be readily transported over wet and swampy grounds, where ordinary carriages would sink into the ground so as to render transportation exceedingly slow and difficult, if not altogether impracticable. This result is attained with certainty by my invention, inasmuch as the vehicle or weight of the freight rests upon a broad platform of the length of the entire vehicle or train of vehicles, thus effectually preventing the same from sinking into the ground, as aforesaid.

To enable those skilled in the art to understand and make use of my invention, I will now proceed to describe the same with particularity, reference being made to the said drawings.

J represents the frame-work of my improved vehicle, which may be made of timbers of the proper size and quality to afford the requisite strength, or of iron, as may be preferred, or as may be the better adapted to the uses for which the vehicle is to be employed.

A and B represent the truck-wheels which support the vehicle and rest upon the track of the road, being provided with suitable flanges to prevent them from running off the track. The axle of the wheels A revolves with the wheels, and is provided with the rigger or pulley C, which is fixed to the axle. The axle of the raised wheels E is also provided with a similar pulley, D, which is connected with C by means of the belt *c*. At the end of the machine opposite that at which the wheels E are situated there is a similar pair of wheels, (marked F,) around which wheels E and F pass the endless aprons or chains. (Marked G.)

Thus, by the forward motion of the vehicle or the consequent revolution of the wheels A, the wheels E are revolved, which, together with the wheels F, carry around the endless belts or chains, (marked G,) which are supported above upon the rollers (marked *a*) and below in the box or trough, provided with open ends. (Marked I.) To the said endless belts G there are attached at suitable and regular distances from each other a series of hooks or other similar devices, which, as the said endless belts revolve in the direction indicated by the red arrows, hook into or otherwise attach themselves to the planks L successively by means of suitable corresponding attachments upon said planks, and thus the planks L are, as the machine moves on, one by one picked up, carried along upon the top of the vehicle and down at the front end thereof, and deposited and adjusted to the next preceding plank in such a manner as to continue the track; and this operation is repeated so long as the vehicle is moved, the relative time of the revolutions of the truck-wheels A and raised wheels E, as well as the relative diameters of said wheels and the distance of the aforesaid hooks upon G from each other, all being so regulated and proportioned that the said planks L are each and every of them deposited and adjusted in front of the machine at the proper time and with perfect certainty, so that there is no danger that the track will fail and the machine run off into the mud.

H with its attachments is designed to control and regulate the planks L in their descent to the front of the machine, so that they shall be deposited in the proper position, and not fall off as they begin the descent. This object is effected by a set of springs or elastic arms, $b$ $d$ $e$, attached to said frame H, whereby the planks are kept and retained by pressure upon the circumference of the wheels F until they reach the proper positions beneath said wheels, when they drop and are drawn up snugly to their place by means of the attachments upon the belt G, as aforesaid.

The planks L at each end thereof are provided with the pins $r$, which interlock with pins $f$ in the wheels F and assist in controlling the descent of the planks to the ground; but the most important function of said pins $r$ is to operate the device for detaching the hooks on G from the planks L after said planks are adjusted.

In Fig. 3 are represented two of the planks L with their attachments. T represents the sections of the track. $o$ $o$ are pins arranged each side of the depression $n$, between which the triangular or wedge-shaped point $e$ enters and brings the track into line and prevents the same from getting out of place; and $q$ are depressions cut out in the said planks at the edge thereof, over which the horizontal pins $l$ extend, leaving a space underneath, so that the hooks upon the belt G can readily attach themselves thereto, as aforesaid, said depressions and pins $l$ being arranged directly beneath said belt G for that purpose.

As the vehicle moves forward, the spring $m$ strikes against the pins $r$ successively, and is consequently forced inward, and the ends of said springs force the hooks aforesaid upon the belt G in far enough to allow them to pass by the ends of the said pins $l$, and thus detach said hooks from the planks L at the exact time when they are properly adjusted and drawn up to the preceding plank, as shown in Fig. 3. After being detached, they pass along and through the supporting-trough I, whose curved aprons at the ends (marked $i$) render it impossible for said hooks to catch upon the said trough.

The planks L are made of sufficient length so that a horse can walk by the side of the vehicle upon said planks, and any number of horses may be attached upon each side for the purpose of propelling the vehicle, or any other propelling power may be used if desired.

The load to be transported is placed within the frame-work of the vehicle, and in other ways as may be found convenient.

In order to provide for moving on a curve, it is necessary that the wheels F and the axle thereof should be made adjustable in their bearings, or should be provided with adjustable bearings, so as to be turned slightly in the direction of the proposed curve, and at the same time a similar and corresponding adjustability should be given to the springs $m$, which throw the hooks off from the pins $l$. By changing the device H with its attachments to the opposite end of the vehicle, it can be made to run backward as well as forward by a very easily-made adjustment of the hooks upon the belt G.

From each side of the vehicle there may project horizontal bearings to support small wheels, which roll along upon the ends of the planks to steady the vehicle and keep it from tipping over.

Upon the ends of the planks are the pins $p$, which are provided with hinges so as to lie down flat upon the planks, or in channels or grooves cut therein for that purpose, but which hang down when the planks are passing over the machine, and interlock with the pins $f$ upon the wheels F, for the purposes aforesaid.

Having described my improved automatic track-laying vehicle, I will now specify what I claim as new and desire to secure by Letters Patent—

1. The endless belts G, provided with hooks or their equivalent, in combination with a vehicle to be moved upon a track constructed substantially as described, operating substantially as and for the purposes described.

2. In combination with the above, the elastic arms $b$, $d$, and $e$, or their equivalent, operating as herein set forth.

3. The combination and arrangement of the endless belts G, the wheels F and E, with the drums C D, and truck-wheels A, operating in the manner shown and described.

4. Providing the wheels F with the pins $f$, when used in combination with the planks L, provided with the pins $r$, or the hinged pins $p$, arranged and operating as and for the purposes shown and specified.

5. The arrangement of the springs $m$ with the pins $r$ on the planks, operating as and for the purposes herein described.

6. The combination of the belts G, provided with hooks, as aforesaid, with the planks L, provided with the pins $l$, arranged and operating as and for the purposes specified.

7. The combination and arrangement of the wedge-shaped point $e$ with the depression $n$ and pins $o$ $o$, as and for the purposes set forth.

8. The manner of constructing a track herein shown, whereby the same is made removable by sections, as and for the purposes shown.

9. Taking up said sections of the track from the rear of the machine and depositing them in front thereof by an automatic mechanism attached to a vehicle moving over said track, substantially as herein shown and set forth.

JOHN L. NICOLAI.

Witnesses:
W. E. MAUS,
L. L. COBURN.